(12) United States Patent
Brasher et al.

(10) Patent No.: US 10,604,680 B2
(45) Date of Patent: Mar. 31, 2020

(54) POLYMER COATING FORMULATION AND APPLICATION METHODS

(71) Applicants: Jon H. Brasher, Opelika, AL (US); James Woodham, Opelika, AL (US); Christopher Campbell, Tallahassee, FL (US); Stuart Christmas, Opelika, AL (US)

(72) Inventors: Jon H. Brasher, Opelika, AL (US); James Woodham, Opelika, AL (US); Christopher Campbell, Tallahassee, FL (US); Stuart Christmas, Opelika, AL (US)

( * ) Notice: Subject to any disclaimer, the term of this patent is extended or adjusted under 35 U.S.C. 154(b) by 0 days.

(21) Appl. No.: 15/918,108

(22) Filed: Mar. 12, 2018

(65) Prior Publication Data

US 2018/0265746 A1 Sep. 20, 2018

Related U.S. Application Data

(60) Provisional application No. 62/470,954, filed on Mar. 14, 2017.

(51) Int. Cl.
*C09J 7/38* (2018.01)
*C09D 127/06* (2006.01)
*C09J 7/28* (2018.01)
*C09J 5/00* (2006.01)
*C09J 7/24* (2018.01)

(52) U.S. Cl.
CPC ............ *C09J 7/381* (2018.01); *C09D 127/06* (2013.01); *C09J 5/00* (2013.01); *C09J 7/245* (2018.01); *C09J 7/28* (2018.01); *C09J 2427/00* (2013.01); *C09J 2427/006* (2013.01)

(58) Field of Classification Search
CPC ........................................................ C09J 7/381
See application file for complete search history.

(56) References Cited

U.S. PATENT DOCUMENTS

| 2012/0070617 A1* | 3/2012 | Dugast ...................... B44F 9/02 428/151 |
| 2018/0021809 A1* | 1/2018 | Bautista Mester ...... B05D 7/14 428/461 |

* cited by examiner

*Primary Examiner* — Daniel H Lee
(74) *Attorney, Agent, or Firm* — J. Wiley Horton

(57) ABSTRACT

A plastisol formulation configured for use in coating substrates. The inventive formulation has exceptional flexibility over a wide range of temperatures. It is comprised of polyvinyl chloride, a plasticizer, a stabilizer, preferably a pigment, and a UV inhibitor/light stabilizer. The formulation is applied to a substrate and then cured by exposing it to an elevated temperature.

16 Claims, 5 Drawing Sheets

POLYMER COATING FORMULATION AND APPLICATION METHODS

CROSS-REFERENCES TO RELATED APPLICATIONS

This non-provisional patent application claims the benefit of an earlier-filed provisional application having Ser. No. 62/470,954. The earlier application was filed on Mar. 14, 2017 and it listed the same inventors.

STATEMENT REGARDING FEDERALLY SPONSORED RESEARCH OR DEVELOPMENT

Some of the work underlying this application has been federally sponsored.

MICROFICHE APPENDIX

Not Applicable.

BACKGROUND OF THE INVENTION

1. Field of the Invention

The present invention pertains to the field of coatings. More specifically, the invention comprises a polymer coating formulation and methods fob applying the formulation to various substrates.

2. Description of the Related Art

The present invention comprises a polymer formulation that is suitable for application to a wide variety of substrates. Poly vinyl chloride ("PVC") is a well-known and widely used polymer having the following molecular structure:

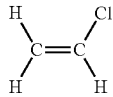

PVC is readily polymerized to form a solid having desirable physical properties. The polymerized form of PVC has the following molecular structure:

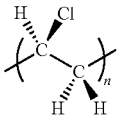

It is also known to create various "Plastisols" using PVC particles as an ingredient. In this context the term "Plastisol" refers to a suspension of PVC particles in a liquid plasticizer. A common plasticizer for use with PVC is a phthalate ester. The ester selected is often an ester of polycarboxylic acid with linear or branched aliphatic alcohols of moderate chain link. One example (using IUPAC terminology) is Bis (2-ethylhexyl) phthalate. This plasticizer is commonly called "DEHP." Many other plasticizers are also used with PVC, with some being better suited to certain applications than others.

Plastisols do not dry under normal conditions. They remain a liquid having a viscosity determined by the formulation used. They may be sprayed, painted on, or applied via dipping (to name a few examples). Once applied, Plastisol must generally be cured via heating. It is common for a Plastisol to be cured via heating to around 180 degrees centigrade (350 degrees Fahrenheit). The curing process transitions the Plastisol to a non-crystalline solid. The result is typically a tough and durable coating.

The present invention provides a durable Plastisol-based coating. The inventive coating may be applied to a wide variety of substrates—as will be described.

BRIEF SUMMARY OF THE INVENTION

The present invention comprises a plastisol formulation configured for use in coating substrates. The inventive formulation has exceptional flexibility over a wide range of temperatures. In its preferred embodiments, the inventive formulation includes polyvinyl chloride, a plasticizer, a stabilizer, a pigment, and a UV inhibitor/light stabilizer. The formulation is applied to a substrate and then cured by exposing it to an elevated temperature.

Figure 1:
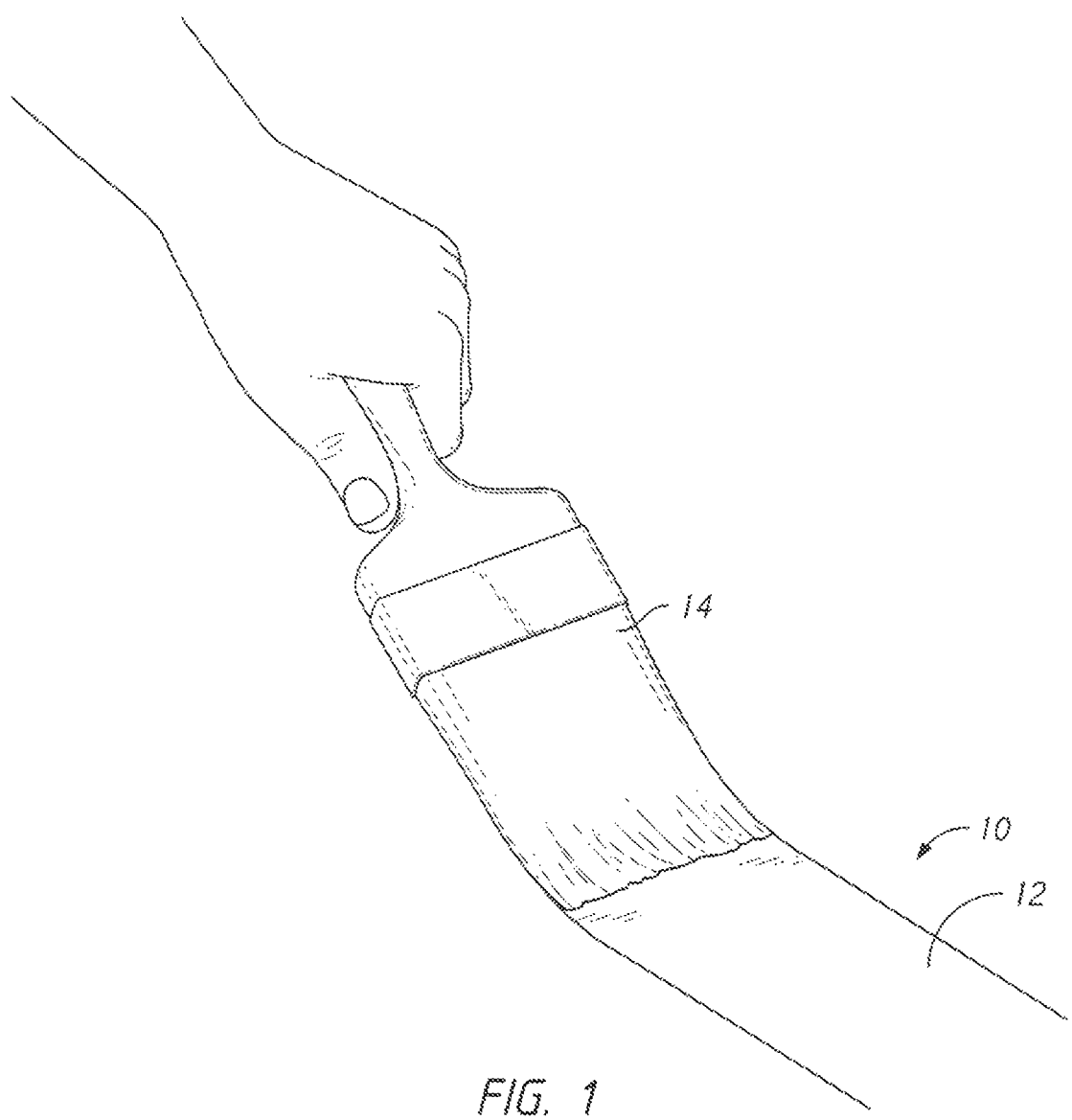
FIG. 1 is a perspective view, showing the use of a brush to apply the inventive coating.

REFERENCE NUMERALS USED IN THE DRAWINGS 10 substrate
12 inventive composition
14 brush
16 roller
18 sheet
20 removable backing
22 adhesive layer
24 primer

DETAILED DESCRIPTION OF THE INVENTION

The inventive formulation is suitable for use as a corrosion mitigation coating. It can be applied to a substrate that is cleaned and prepped but it can also be applied to a substrate that already has significant existing corrosion. Once cured, the formulation provides a tough coating that is useful for blocking ultraviolet radiation and stray electrical currents. It can also protect against penetration by birds, as well as marine and animal life.

As described in the prior art section, it is known to use a phthalate ester as a plasticizer, with one common example being Bis (2-ethylhexyl) phthalate ("DEHP"). However, in light of environmental concerns, DEHP is disfavored and is therefore not employed in the preferred embodiments of the present invention. Instead, either dioctyl terephthalate ("DOTP") or any of a class of non-phthalate plasticizers is used. In the context of this application, both DOTP and the others will be referred to as a "non-phthalate plasticizer."

In the preferred embodiments, the inventive composition contains the following constituents (stated in terms of mass):

| Ingredient | Percentage |
| --- | --- |
| Polyvinyl chloride resins | 10-50% |
| Non-Phthalate Plasticizer | 10-50% |
| Epoxy Soy Oil (stabilizer) | 2-90% |
| Pigment | 2% |
| UV inhibitor/light stabilizer | 3-5% |

The plasticizer is added in approximately the same amount as the PVC. Thus, if 20 parts PVC are present then about 20 parts plasticizer is preferred. When mixed the inventive composition is in liquid form. The PVC resin particles are suspended in a plasticizer mixed with natural oils, pigments, and a UV inhibitor. The curing process is a function of heat and time. When the liquid composition is heated to 360 degrees Fahrenheit (about 180 degrees centigrade), the PVC resin particles begin to absorb the plasticizer and oils. The resin particles then begin to swell. As the particles swell, they begin to press against and fuse with adjacent particles. This process eventually produces a solid, inert, and non-porous layer. The curing process also causes the coating to adhere to and assume the shape of the substrate it covers.

A cured polymer chain of the inventive composition is depicted as follows:

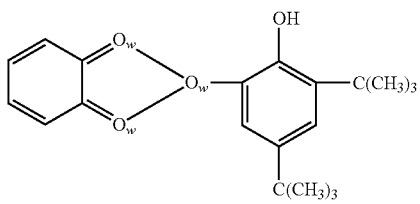

(In this depiction $O_w$ represents the UV inhibitor.)

Once the curing process is complete, the resulting coating is inert. Any reaction to chemicals requires months of constant exposure. As an example, the coating will only break down upon exposure to a 95% solution of sulfuric acid after 60 days of constant immersion. Similarly, breakdown to gasoline requires 480 days of constant immersion in a solution of gasoline and oil.

The cured coating will not support combustion. A direct flame exposure of approximately 15 minutes is required to produce a flame in the substrate. However, even then, the substrate will self-extinguish once the external flame is removed. In any event, the substrate never returns to a liquid state.

The inventive composition may be applied to a substrate (prior to curing) using the following methods, among others:
1. Dipping;
2. Spray-painting;
3. Rolling; and
4. Brushing.

Once the application is complete, the inventive composition is cured by adding heat.

Figure 2:
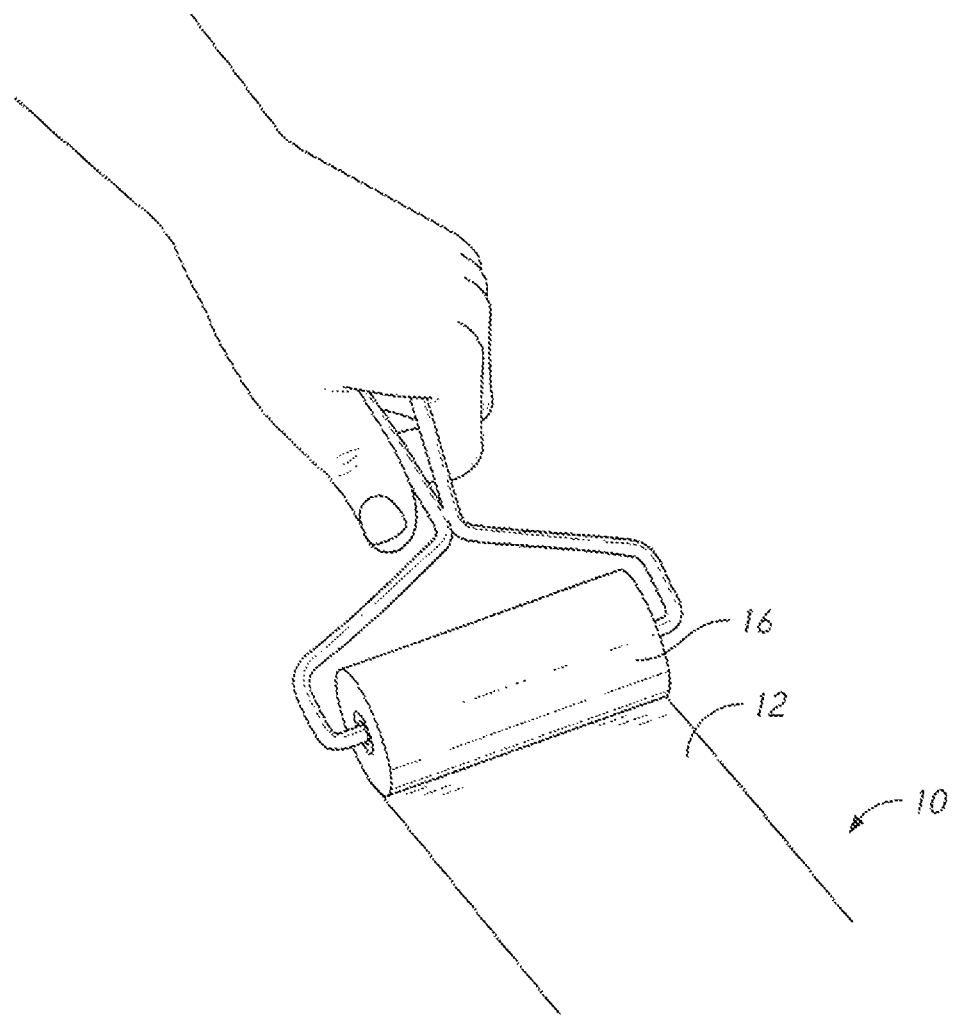
FIG. 2 is a perspective view, showing the use of a roller to apply the inventive coating.

FIG. 1 depicts the application of the inventive composition using a brush. Substrate 10 is suitably cleaned (such as by sanding and the use of a solvent). Brush 14 is then dipped in the inventive composition and then moved along the substrate to deposit inventive composition 12 on substrate 10. FIG. 2 depicts the application of inventive composition 12 using roller 16. A suitably thinned embodiment of the inventive composition may be sprayed on a substrate. Once the substrate is coated with the inventive composition, heat is applied to cure the composition.

Heat may also be applied to the substrate before the inventive composition is applied. As an example, for a field application to a steel substrate the substrate is typically excavated (if submerged) and cleaned. A primer is then applied. Heat is then applied to create good cross linking between the primer and the steel. The inventive composition is then applied over the primer. Heat is then applied to cure the inventive composition. Additional layers of the inventive composition can be added to increase thickness.

Figure 3:
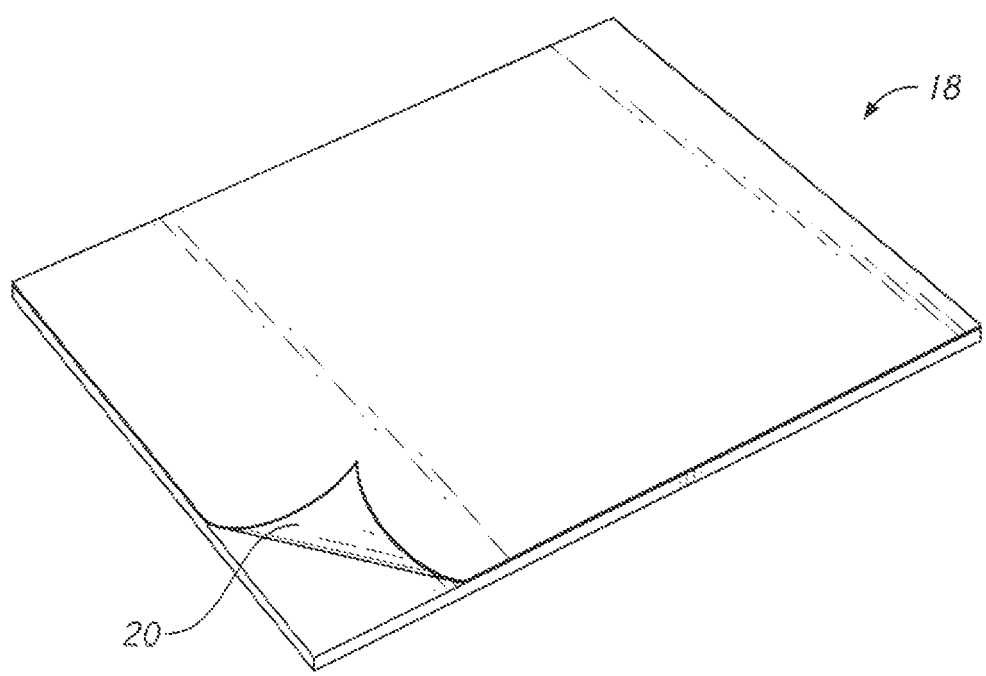
FIG. 3 is a perspective view, showing a sheet of the inventive coating.

In addition, it is possible to provide a "stick-on" version of the inventive composition. In this embodiment, a highly flexible sheet of the formulation is provided with an adhesive layer that is compatible with the curing process. The adhesive layer may be provided with a removable backing. FIG. 3 shows an embodiment of this approach. Sheet 18 of the inventive polymer is provided with removable backing 20. In use, a user or users cuts the flexible sheet to the desired shape to ensure coverage. The backing is then removed and the sheet is pressed against the substrate. Once the sheet is in the desired position, heat may be added to facilitate adhesion of and shaping of the composition to the substrate.

Figure 4:
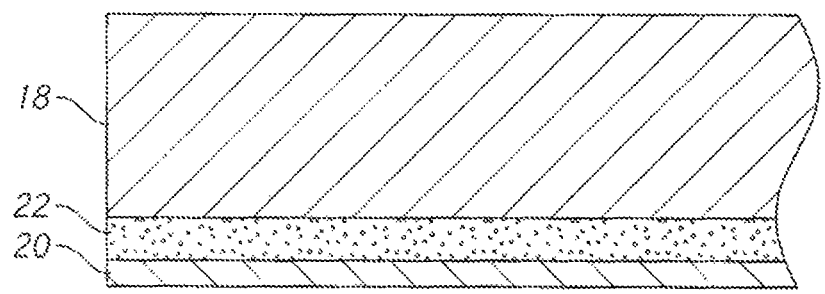
FIG. 4 is a detailed elevation view, showing the layers used in the sheet depicted in FIG. 3.

FIG. 4 shows a detailed elevation view through the embodiment of FIG. 3. Sheet 18 comprises the inventive polymer. Adhesive layer 22 is applied to the back side of the sheet and removable backing 20 covers the adhesive layer until the time that the sheet is applied to a substrate.

Figure 5:
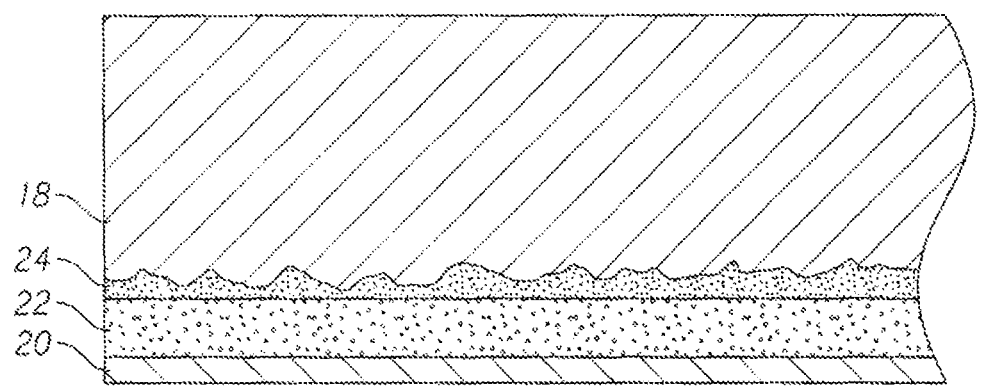
FIG. 5 is a detailed elevation view, showing an alternate embodiment of the sheet depicted in FIG. 3.

FIG. 5 shows an enhanced version of the "peel and stick" embodiment. Sheet 18 includes a textured lower surface to aid adhesion. Primer 24 is applied to this surface and adhered to it. Adhesive layer 22 is adhered to the primer. Removable backing 20 covers the adhesive layer as before.

While the invention is not limited to any particular adhesive layer. "Very High Bond (VHB)" adhesive as marketed by 3M has been found to be particularly effective. Sheet 18 and primer 24 are pressed into an exposed side of the 3M VHB. The VHB has a release film that is peeled off prior to applying the sheet of coating to a substrate. This peel and stick version can be applied to galvanized steel, weathering steel ("CORTEN"), and smooth finished concrete.

The inventive formulation can also be used as a carpet or flooring backing. The coating can be partially cured to form a gel. In this gelled state, fibers are pressed into the gel and the curing is then completed. The result is a sheet of the inventive polymer with the fibers attached. The back is then glued or sewn to carpet. Another method is to completely cure the sheet of coating and then glue it or sew it to the carpet.

Although the preceding description contains significant detail, it should not be construed as limiting the scope of the invention but rather as providing illustrations of the preferred embodiments of the invention. Those skilled in the art will readily envision many other variations. Thus, the language used in the claims shall define the invention rather than the specific embodiments described.

Having described our invention we claim:
1. A method of applying a polymer formulation to a substrate, comprising:
   (a) providing a cross-linking polymer including the following ingredients stated in terms of a percentage by mass,
      (i) between 10% and 50% polyvinyl chloride resins,
      (ii) between 10% and 50% plasticizer,
      (iii) between 2% and 80% stabilizer;

(b) providing said cross-linking polymer as a sheet having a back side and including an adhesive backing on said back side, wherein said back side of said sheet of cross-linking polymer includes a textured surface and said adhesive backing lies proximate said textured surface;

(c) providing a substrate;

(d) applying said cross-linking polymer to said substrate by pressing said adhesive backing against said substrate; and (e) after said cross-linking polymer is applied to said substrate, applying heat to said cross-linking polymer in order to cure said cross linking polymer.

2. The method of applying a polymer formulation as recited in claim 1, wherein said plasticizer used in said cross-linking polymer comprises a non-phthalate plasticizer.

3. The method of applying a polymer formulation as recited in claim 1, wherein said cross-linking polymer further comprises an epoxy soy oil stabilizer.

4. The method of applying a polymer formulation as recited in claim 3, wherein said cross-linking polymer further comprises a UV inhibitor/light stabilizer.

5. The method of applying a polymer formulation as recited in claim 1, wherein said plasticizer comprises dioctyl terephthalate.

6. The method of applying a polymer formulation as recited in claim 1, wherein said sheet of cross-linking polymer includes a primer layer between said textured surface and said removable backing.

7. The method of applying a polymer formulation as recited in claim 1, wherein said adhesive backing comprises VHB® adhesive doubled-sided tape.

8. The method of applying a polymer formulation as recited in claim 1, wherein said substrate comprises steel.

9. A method of applying a polymer formulation to a substrate, comprising:

(a) providing a cross-linking polymer including the following ingredients stated in terms of a percentage by mass, (i) between 10% and 50% polyvinyl chloride resins,
(ii) between 10% and 50% plasticizer,
(iii) between 2% and 80% stabilizer;

(b) providing said cross-linking polymer as a sheet having a back side and including an adhesive backing on said back side, wherein said back side of said sheet of cross-linking polymer includes a textured surface and said adhesive backing lies proximate said textured surface;

(c) providing a substrate;

(d) cleaning said substrate;

(e) applying a primer to said substrate;

(f) applying said cross-linking polymer over said primer by pressing said adhesive backing against said primer; and (g) after said cross-linking polymer is applied over said primer, applying heat to said cross-linking polymer in order to cure said cross linking polymer.

10. The method of applying a polymer formulation as recited in claim 9, wherein said plasticizer used in said cross-linking polymer comprises a non-phthalate plasticizer.

11. The method of applying a polymer formulation as recited in claim 9, wherein said cross-linking polymer further comprises an epoxy soy oil stabilizer.

12. The method of applying a polymer formulation as recited in claim 11, wherein said cross-linking polymer further comprises a UV inhibitor/light stabilizer.

13. The method of applying a polymer formulation as recited in claim 9, wherein said plasticizer comprises dioctyl terephthalate.

14. The method of applying a polymer formulation as recited in claim 9, wherein said sheet of cross-linking polymer includes a primer layer between said textured surface and said removable backing.

15. The method of applying a polymer formulation as recited in claim 9, wherein said adhesive backing comprises VHB® adhesive doubled-sided tape.

16. The method of applying a polymer formulation as recited in claim 9, wherein said substrate comprises steel.

\* \* \* \* \*